United States Patent [19]

Henn

[11] 4,177,870
[45] Dec. 11, 1979

[54] HYDROSTATIC FRONT WHEEL DRIVE SYSTEM

[75] Inventor: John I. Henn, Dubuque, Iowa

[73] Assignee: Deere & Company, Moline, Ill.

[21] Appl. No.: 910,645

[22] Filed: May 30, 1978

[51] Int. Cl.² ........................................... B60K 25/04
[52] U.S. Cl. ..................................... 180/243; 60/484; 180/14 A
[58] Field of Search ................ 180/14 A, 44 M, 44 F, 180/44 R, 66 R; 60/484

[56] References Cited

U.S. PATENT DOCUMENTS

| | | | |
|---|---|---|---|
| 3,272,279 | 9/1966 | Budzich | 180/44 M |
| 3,298,252 | 1/1967 | Harris et al. | 74/761 |
| 3,458,005 | 7/1969 | Malm et al. | 180/44 M |
| 3,584,698 | 6/1971 | Larson | 180/14 A |
| 3,874,470 | 4/1975 | Greene | 180/44 M |
| 3,894,606 | 7/1975 | Hunck | 180/66 R |
| 3,997,017 | 12/1976 | Campbell et al. | 180/44 F |
| 4,077,484 | 3/1978 | Dezelan | 180/44 M |

Primary Examiner—Joseph F. Peters, Jr.
Assistant Examiner—Donn McGiehan

[57] ABSTRACT

A motor grader is provided with an electrical control circuit for automatically effecting engagement, speed, and direction control of an auxiliary hydrostatic front wheel drive system to augment the primary engine-driven rear wheel drive system.

9 Claims, 7 Drawing Figures

HYDROSTATIC FRONT WHEEL DRIVE SYSTEM

BACKGROUND OF THE INVENTION

The present invention relates to an auxiliary front wheel drive system for a vehicle and more particularly relates to an auxiliary front wheel drive system for a motor grader.

The prior art includes various types of vehicles having main or primary drive systems for driving first sets of wheels by means of engine-driven mechanical transmissions, and auxiliary or assist drive systems for driving second sets of wheels by means of engine-driven hydrostatic transmissions when operating conditions are such that additional traction is desired. Representatives of these prior art vehicles are those respectively disclosed in U.S. Pat. No. 3,458,005 issued to Malm et al on July 29, 1969, U.S. Pat. No. 3,584,698 issued to Larson et al on June 15, 1971 and U.S. Pat. No. 3,997,017 issued to Campbell et al on Dec. 14, 1976.

The auxiliary drive system disclosed in the above-identified Malm et al and Campbell et al patents are similar to each other in that they both include electrical controls and utilize a variable displacement, pressure-compensated pump for delivering working fluid to fixed displacement hydraulic front wheel drive motors. Because it is a characteristic of such pumps to maintain the pressure of the working fluid at a preselected pressure and the pressure necessary for rotating the wheels depends upon the resistance encountered by them, then the pressure selected for maintenance by the pump must be high enough to rotate the front wheels at the highest expected resistance. The result of such systems has been that the front wheels tend to overspeed anytime the resistance to their rotation decreases substantially below an average resistance such as occurs, for example, when the wheels enter a mud puddle, are raised off the ground or encounter an icy surface. This overspeeding is undesirable since it results in undue engine horsepower consumption and working fluid heating and sometimes results in material such as gravel or mud and the like being thrown onto the vehicle and on any other thing that may be in the vicinity of the front wheels.

The auxiliary drive system disclosed in the above-identified Larson et al system avoids the overspeeding problem inherent in the Malm et al and Campbell et al auxiliary drive systems by employing a fixed displacement pump driven by the main drive transmission input shaft and having its displacement matched to that of the auxiliary drive motors such that, when the transmission is in its first speed range, the speed of the main drive wheels is required to be a preselected percentage greater than the speed of the auxiliary drive wheels before the pump has capacity to develop any driving torque in the motors, and, when the transmission is in its second speed range, the pump will have capacity to develop driving torque in the motors when the main and auxiliary drive wheel speeds are equal. However, the auxiliary drive system of Larson et al lacks versatility since the point at which the pump will supply sufficient fluid for developing driving torque in the auxiliary drive motors is very much dependent upon the speed ratios of the main traction drive transmission. In fact, the Larson et al auxiliary drive system includes a two-speed final drive transmission which is shifted in response to the main drive transmission being shifted to compensate for speed ratio changes in the main drive transmission.

SUMMARY OF THE INVENTION

According to the present invention, there is provided a novel hydrostatic auxiliary drive system for a vehicle and more particularly there is provided a novel front wheel drive system for a motor grader.

A primary object of the invention is to provide an auxiliary hydrostatic drive system including a reversible, variable displacement pump connected to a pair of fixed displacement wheel motors such as to form a closed loop system and associated with controls for automatically controlling its displacement for maintaining a preselected correspondence between the respective speeds of the main and auxiliary drive wheels.

A more specific object is to provide an auxiliary drive system including hydraulic circuitry for routing working fluid to the auxiliary drive wheel motors and to respective pressure-controlled normally disengaged clutches which are operative when pressurized to establish respective driving connections between the motors and the auxiliary drive wheels.

A further object is to provide an auxiliary drive system, as set forth in the immediately preceding object, wherein disengagement of the auxiliary drive wheels from the wheel motors is automatically effected anytime the main traction drive clutch is disengaged, or when the main traction drive transmission is shifted to neutral or to selected speed ratios where the auxiliary drive is not required to thus permit free wheeling of the auxiliary drive wheels.

Yet another object is to provide hydraulic circuitry, as set forth in the preceding object, which routes the working fluid pressure to the wheel engagement clutches such that the wheel may overrun the wheel motors to thus eliminate torque interferences between the main and auxiliary drive systems, especially during turning operations.

Still another object is to provide hydraulic circuitry, as set forth in the preceding objects, which includes forward and reverse valves operable in response to forward and reverse shuttle-shifting of the main traction drive transmission such as to ensure smooth operation by properly timing the engagement of the wheel motors with the auxiliary wheels in respect to engagement of the main transmission.

A further object is to provide hydraulic circuitry, as set forth in one or more of the preceding objects, wherein a flow divider-combiner valve is connected between the variable displacement pump and first work ports of each of the wheel motors and wherein a restricted passage joins respective lines connecting the divider-combiner valve to the first work ports, whereby a partial differential lock action is established which functions to reduce scuffing of the tires during turning. The restricted passage also acts to equalize the pressure between the wheel motors such as to cause the divider-combiner valve to be repositioned to a centered unbiased dividing position after a turn has been completed so that the idling wheel during the turn again develops torque instead of the flow divider-combiner valve remaining in a position wherein it restricts the flow path to that wheel.

These and other objects will become apparent from reading the ensuing description together with the appended drawings.

BRIEF DESCRIPTION OF THE DRAWINGS

FIG. 1b is a right side perspective view of the rearward portion of the motor grader shown in FIG. 1a.

DESCRIPTION OF THE PREFERRED EMBODIMENT

Figure 1A:
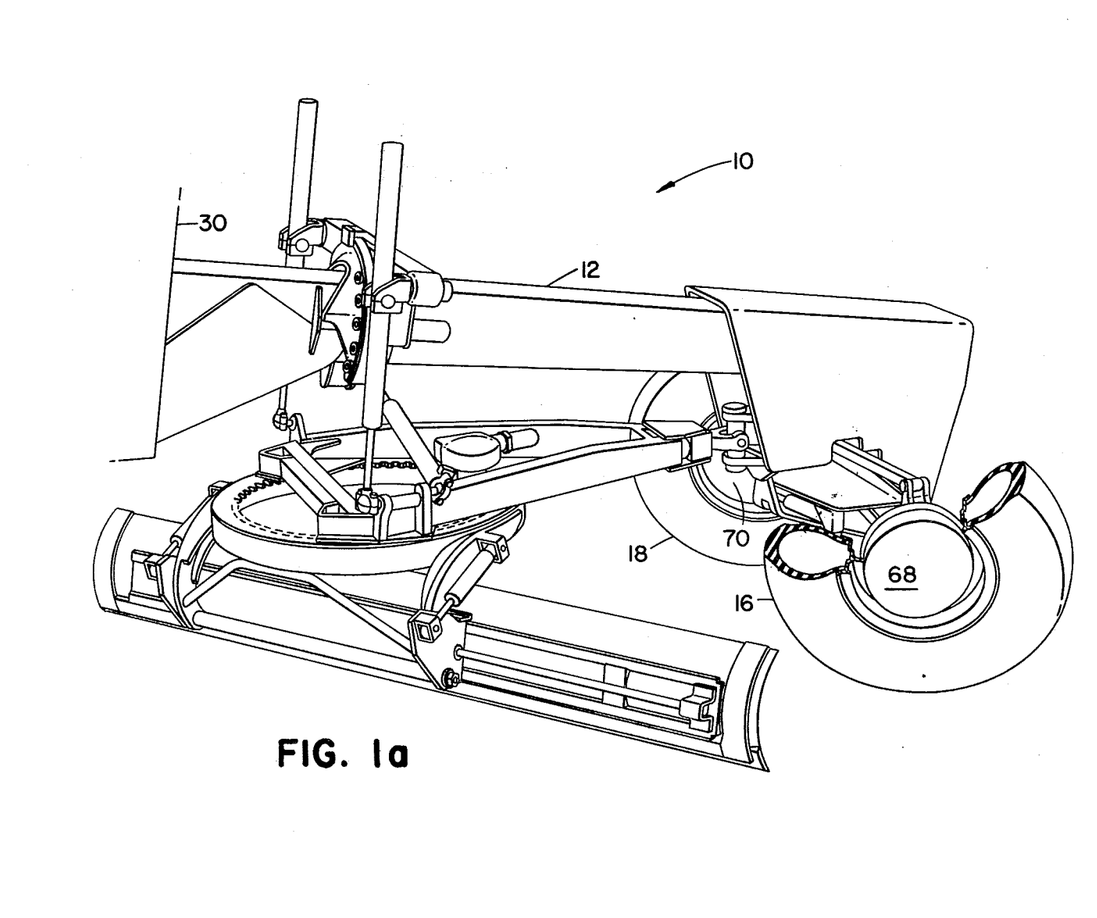
FIG. 1a is a right side perspective view of the forward portion of a motor grader embodying the present invention.
Figure 1B:
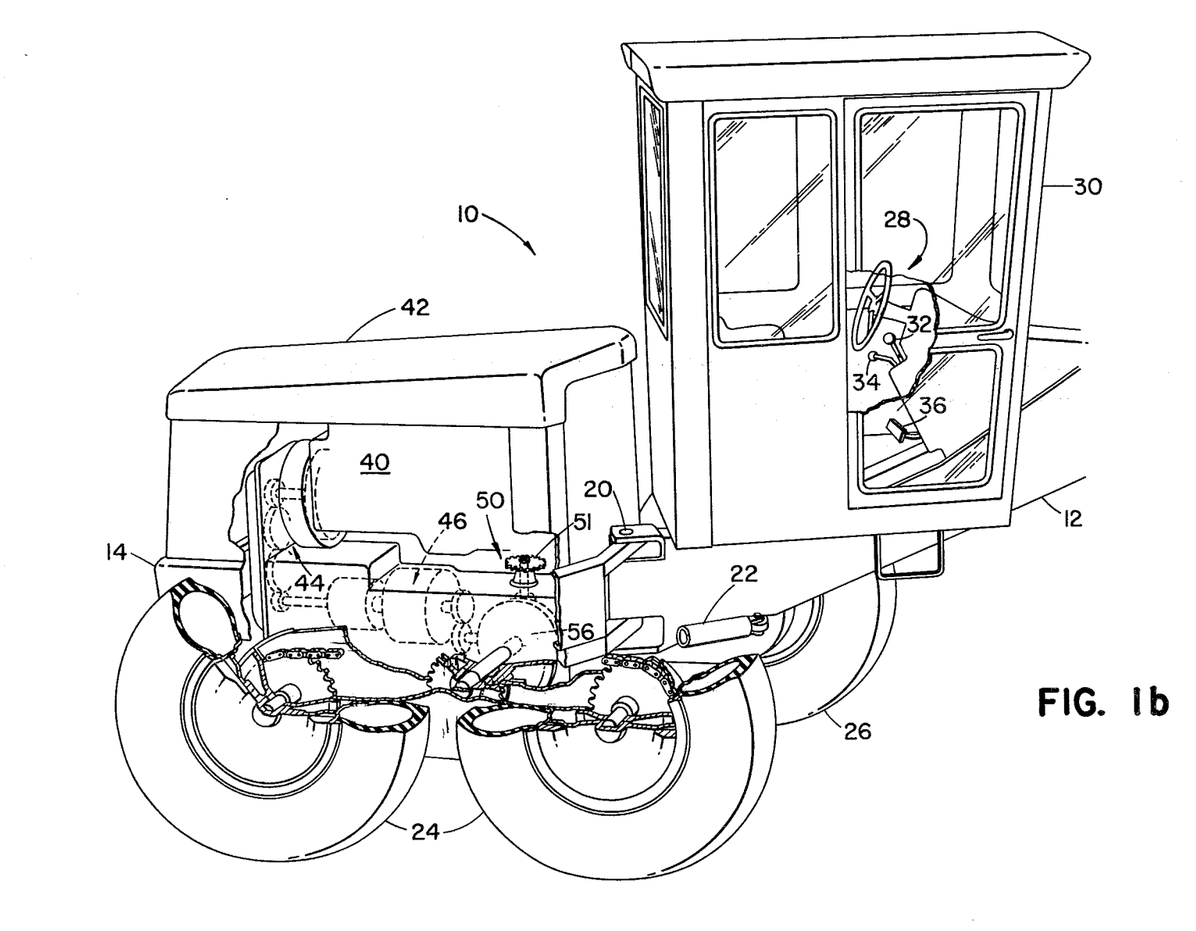

Referring now to FIGS. 1a and 1b, therein is shown a motor grader 10 including front and rear frame sections 12 and 14, respectively. The forward end of the frame section 12 is supported on right and left front wheels 16 and 18, respectively, and the rearward end of the frame section 12 is supported on the rear frame section 14 to which it is connected by a pivot assembly 20 defining an upright axis about which the frame sections are selectively articulated by means of a pair of two-way hydraulic steering actuators, a portion of one being shown at 22. The rear frame section 14 is in turn supported on right and left sets of bogey-mounted main traction drive wheels 24 and 26, respectively.

An operator's station 28 is located on the rear end of the frame section 12 within a cab 30 and has a plurality of controls for the motor grader located thereat, the only controls shown being main traction drive transmission controls including a gear selector lever 32, a direction selector lever 34 and a clutch pedal 36.

The rear frame section 14 supports an engine 40 within a compartment 42. Coupled to an output shaft at the rear of the engine 40 is a set of transfer gears, indicated generally at 44, which drive an input shaft of a main traction drive transmission 46. The principles of the present invention are applicable to vehicles having various types of main traction drive transmissions, however, as specifically disclosed herein the invention is adapted for use with a planetary transmission shiftable to achieve eight forward and four reverse speeds and including a plurality of hydraulically actuated clutches and brakes (FIG. 6) including a main drive clutch 47, which disengages the transmission whenever the pedal 36 is depressed, a forward drive clutch 48, which is actuated whenever the direction selector lever 34 is moved from neutral to place the transmission in a selected forward driving mode, and a reverse drive brake 49, which is actuated whenever the direction selector lever is moved from neutral to place the transmission in the reverse driving mode. An example of such a transmission is disclosed in U.S. Pat. No. 3,298,252 issued to Harris et al on Jan. 17, 1967 and incorporated herein, in its entirety, by reference.

Figure 5:
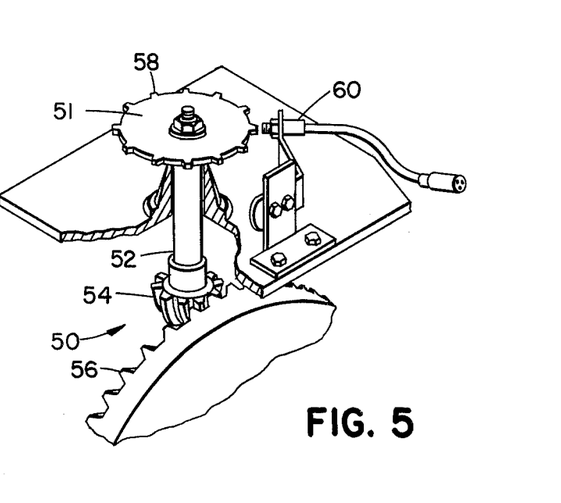
FIG. 5 is a perspective view showing a portion of the differential section of the main transmission and showing a conventional digital magnetic sensor for sensing the speed of the main traction drive wheels.

In any event, the transmission 46 has an output shaft coupled to a differential gear set 50 which is in turn coupled to the rear sets of wheels 24 and 26 by respective final drive gear trains including respective planetary gear sets (not shown). As can best be seen in FIG. 5, a parking brake disc 51 is also coupled to the gear set 50, the coupling including a shaft 52 having the disc 51 fixed to its upper end and a spiral gear 54 integral with its lower end and meshed with a differential ring gear 56. A plurality of teeth 58 are provided at the periphery of the disc 51 and a digital magnetic sensor 60 is mounted adjacent the path swept by the teeth 58 and is operative for sending out electrical pulses which correspond to the speed of rotation of the disc 51 which in turn corresponds to the average speed of rotation of the rear sets of wheels 24 and 26. The purpose for the sensor 60 is described more fully hereinbelow.

Figure 2:
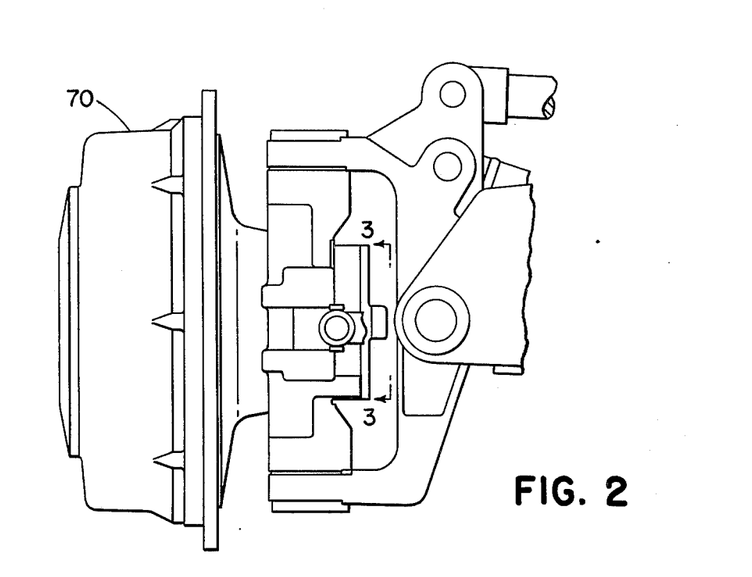
FIG. 2 is an elevational view of the left front grader wheel and hydraulic motor for driving the same.
Figure 3:
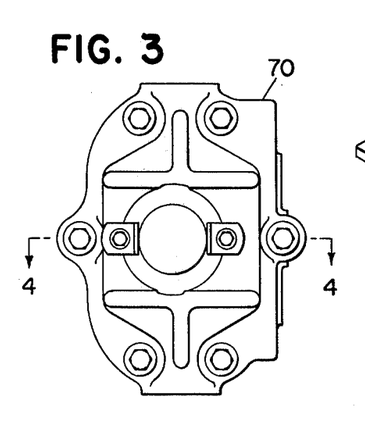
FIG. 3 is a view of the hydraulic motor taken along the line 3—3 in FIG. 2.
Figure 4:
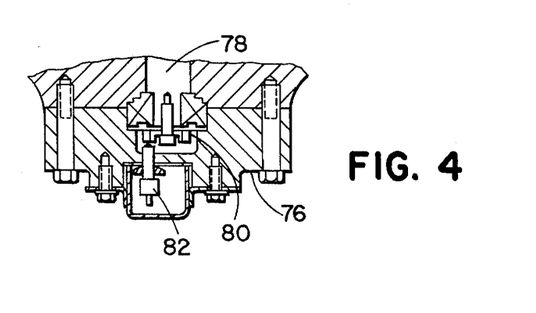
FIG. 4 is a sectional view taken along the line 4—4 in FIG. 3 and showing a conventional digital magnetic sensor for sensing the speed of the left front wheel motor.
Figure 6:
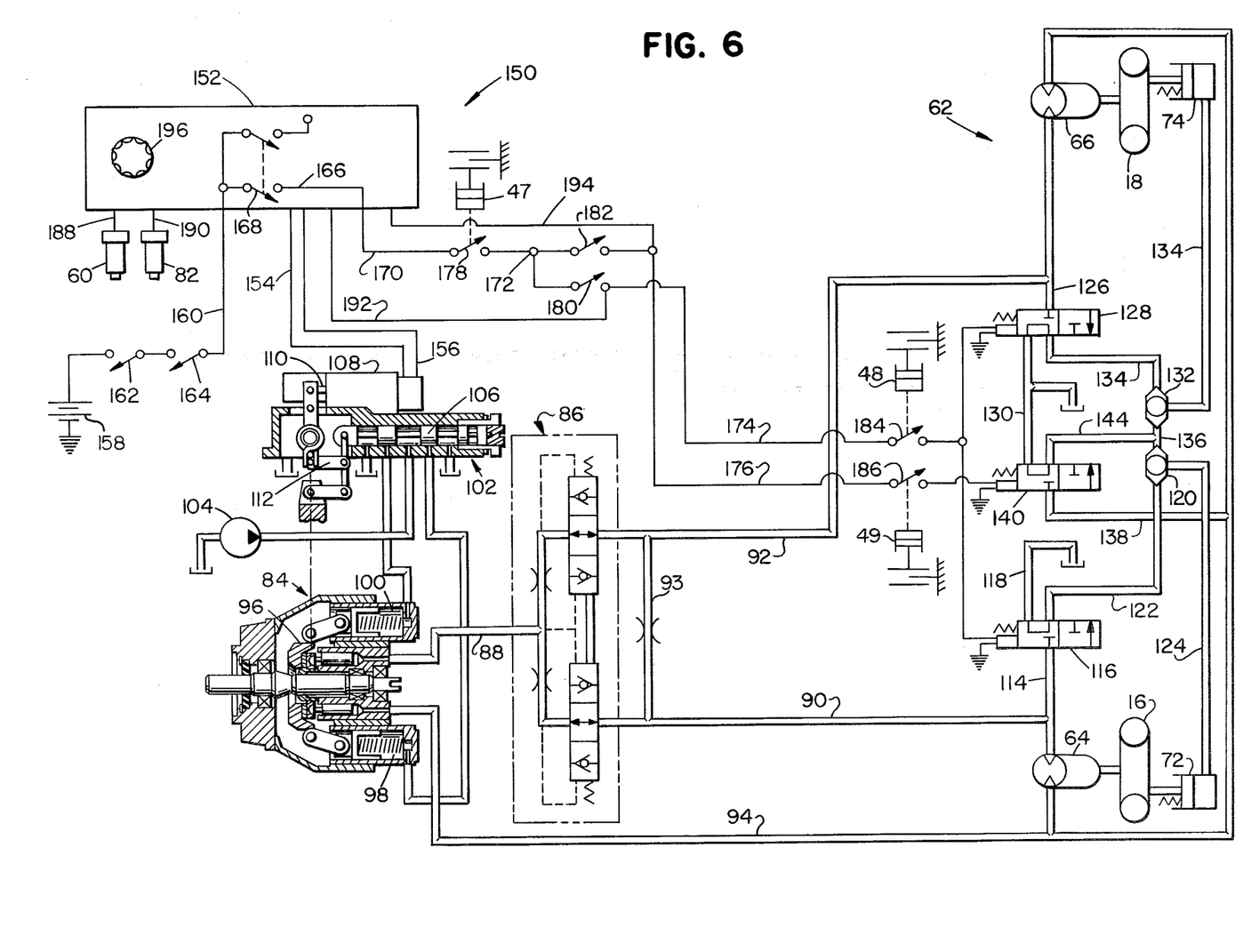
FIG. 6 is a schematic of the front wheel drive system.

An auxiliary front wheel drive system 62 (FIG. 6) is provided for selectively augmenting the main traction drive system of the grader 10 and includes right and left hydraulic motors 64 and 66 respectively located within housings 68 and 70 (FIG. 1a), which are fixed to the rims of the wheels 16 and 18 and which may be selectively coupled for being driven by the motors through means of planetary gearing (not shown) upon a predetermined minimum pressure being received by normally disengaged right and left pressure-engageable elements respectively in the form of clutches 72 and 74 (FIG. 6). Referring now to FIGS. 2-4, it can be seen that the left housing 70 includes a removable inner member 76 which covers an inner end of a rotor 78 of the motor 66. Fixed to the rotor 78 is a toothed member 80 and mounted adjacent the path traced by the teeth of the member 80 is a digital magnetic sensor 82 which is operable for producing an electrical pulse signal that is proportional to the speed of rotation of the rotor 78. The purpose of the sensor 82 is set forth hereinbelow.

Referring now to FIG. 6, it can be seen that the auxiliary front wheel drive system 62 includes a reversible variable displacement pump 84 having an upper port connected to a port at one side of a conventional flow divider-combiner valve 86 by a supply return line 88, the valve 86 having a pair of ports at its opposite side respectively connected to respective first work ports of the wheel motors 64 and 66 by supply-return lines 90 and 92, which are connected together by a restricted line 93 for a purpose explained below. Connected between a lower port of the pump 84 and respective second work ports of the motors 64 and 66 is a branched supply-return line 94. Thus, it will be appreciated that a closed loop hydraulic circuit extends between the pump 84 and motors 64 and 66 and that the latter are connected in parallel with one another.

The pump 84 is a conventional axial piston pump having an angularly adjustable swash plate 96 to which one-way hydraulic actuators 98 and 100 are respectively linked at lower and upper locations thereof and are respectively pressure-actuatable to move the swash plate from a centered position, as shown, so as to establish forward and rearward pumping conditions in the pump 84 respectively resulting in fluid being displaced from the line 94 to the line 88 and vice versa.

A pilot-operated control valve 102 is connected to the actuators 98 and 100 and to a pump 104 and includes a valve spool 106 selectively shiftable rightwardly and leftwardly, of an illustrated neutral position, for respectively pressurizing the actuators 98 and 100. The movement of the valve spool 106 is in turn controlled by a linear electrohydraulic actuator 108 having a reciprocable output member 110 connected to the spool 106, the actuator 108 being of a commercially available type which exhibits the characteristic of displacing the member 110 in direction and magnitude in accordance with the direction and magnitude of electrical control signals sent to the actuator 108, in a manner set forth hereinbelow, to effect automatic control of the actuator 108 and consequently of the magnitude and direction of displacement of the pump 84. A feedback linkage 112 is connected between the swash plate 96 and the valve spool 106 and acts in the usual way to return the spool 106 to its neutral position in response to the swashplate 96 moving to a new position as commanded by the actuator 108.

A hydraulic circuit is provided for connecting the working fluid of the motors 64 and 66 to the clutches 72 and 74 for actuating the latter to establish respective driving connections between the motor 64 and the wheel 16, and between the motor 66 and the wheel 18. Specifically, working fluid for driving the right wheel motor 64 forwardly is routed from the supply-return line 90 to the clutch 72 by a line 114 connected between the line 90 and one side of a right forward drive solenoid-operated valve 116 having its opposite side connected to a drain line 118 and to a port at one end of a shuttle valve 120 by a line 122. The valve 120 has a center port connected to the clutch 72 by a line 124.

Similarly, working fluid for driving the left wheel motor 66 forwardly is routed from the supply-return line 92 to the clutch 74 by a line 126 connected between the line 92 and one side of a left forward drive solenoid-operated valve 128 having its opposite side connected to a drain line 130 and to a port at one end of a shuttle valve 132 by a line 134. The valve 132 has a center port connected to the clutch 74 by a line 134 and has a port at its other end connected to a port at the other end of the shuttle valve 120 by a line 136.

Working fluid for driving the right and left wheel motors 64 and 66 in reverse is routed from the supply-return line 94 to the clutches 72 and 74 by a line 138 connected between the line 94 and one side of a reverse drive solenoid-operated valve 140 having its opposite side connected to the drain line 130 and to the line 136 between the shuttle valves 120 and 132 by a line 144.

The solenoid-operated valves 116, 128 and 140 are all illustrated in de-energized positions wherein they connect the clutches to sump via the drain lines 118 and 130. In a manner to be described hereinafter, the forward drive solenoid-operated valves 116 and 128 will be energized in response to the main traction drive transmission becoming fully engaged for driving forwardly at certain speed ratios. Energization of the valve 116 results in the latter being shifted leftwardly to connect the line 114 to the line 122. The check ball in the shuttle valve 120 will shift to block flow to the line 136 while permitting fluid to flow to the clutch 72 via the line 124. Similarly, energization of the valve 128 results in the latter being shifted leftwardly to connect the line 126 to the line 134. The check ball in the shuttle valve 132 will shift to block flow to the line 136 while permitting fluid to flow to the clutch 74 via the line 134. It will be appreciated then that the fluid pressure for actuating the clutch 72 is isolated from that for actuating the clutch 74 except for the connection via restricted line 93, this isolation being an important feature since it permits the wheels 16 and 18 to overrun the wheel motors 64 and 66 either together, as might occur when the grader is travelling straight, or individually, as occurs when the grader is making a turn. The restricted line 93 functions during such turning to develop a partial differential lock action to reduce scuffing of the tires and also functions as a pressure equalizer between the lines 90 and 92 to return the spool of the flow divider-combiner valve 86 from a position wherein it restricts the flow path to the idling wheel during the turn to a centered unbiased dividing position after the turn has been completed so that the idling wheel motor during the turn again develops torque.

Energization of the reverse drive solenoid-operated valve 140 is effected, in a manner to be presently described, in response to the main traction drive transmission becoming fully engaged for reverse driving. Energization of the valve 140 results in the latter being shifted leftwardly to connect the line 138 to the line 144 to thus connect fluid pressure to the line 136 and hence to both of the shuttle valves 120 and 132. The check balls of the valves 120 and 132 will then seat to prevent flow to drain via the deenergized valves 116 and 128 while permitting flow to the clutches 72 and 74 via the lines 124 and 134.

The operation of that part of the front wheel drive system 62 described hereinabove is selectively automatically controlled by electrical circuitry 150 forming a part of the system 62. Specifically, the circuitry 150 includes an electronic control box 152 containing control circuitry (not shown) for processing various electrical input signals, described hereinafter, and sending out control signals to the linear electrohydraulic actuator 108 via forward and reverse drive signal leads 154 and 156, respectively, connected between the box 152 and the actuator 108. It is here noted that while the specifics of the control circuitry contained in control box 152 forms no part of the invention claimed herein, specific circuitry for use in the control box 152 is described in U.S. Pat. application Ser. No. 910,571 filed on an even date with and having the same assignee as does the instant application. Power for the signal-processing circuitry in the control box 152 is provided by a battery 158 connected to the box 152 by a power supply lead 160 containing an ignition switch 162 connected in series with a switch 164 positioned to be closed by a cam (not shown) in response to moving the gear selector lever 32 to shift the transmission 46 to gears 1-4. The power lead 160 connects to a lead 166 located within the control box 152 and containing an on-off switch 168. Thus, it will be appreciated that no power will be supplied to the box unless all of the switches 162, 164 and 168 are closed.

A lead 170 is connected to the control box 152 such as to join the lead 166, the lead 170 branching at a junction 172 into a forward drive lead 174 connected to the right and left forward drive solenoid-operated valves 116 and 128 and into a reverse drive lead 176 connected to the reverse drive solenoid-operated valve 140. Contained in the lead 170 is a pressure-operated switch 178 which opens when the main clutch pedal 36 is depressed to release the clutch 47. Respectively contained in the leads 174 and 176 are, normally open, forward and reverse drive switches 180 and 182 that are respectively closed by cams (not shown) operated in response to the direction control lever 34 of the transmission being placed in forward and reverse drive effecting positions. Also contained in the lead 174 is a normally open pressure-operated switch 184 which is closed when the forward drive effecting clutch 48 of the transmission 46 becomes fully engaged. Similarly, the lead 176 contains a normally open, pressure-operated switch 186 which is closed when the reverse drive effecting brake 49 of the transmission 46 becomes fully engaged.

The sensors 60 and 82 are respectively connected, via command and feedback input signal leads 188 and 190, to the control box 152 for providing signals for processing by the circuitry in the control box to determine the magnitude of the signals outputted to the linear electrohydraulic actuator 108. The sensors 60 and 82 are not direction sensitive, however, proper polarity of the signal outputted to the actuator 108 is ensured as follows. A forward drive input signal lead 192 is connected to the control box 152 and to the forward drive lead 174 such as to be energized only when the forward drive switch 180 is closed. Similarly, a reverse drive input signal lead 194 is connected to the control box 152 and to the reverse drive lead 176 such as to be energized only when reverse drive switch 182 is closed.

The auxiliary drive system 62 has been found to operate most efficiently when applied to a motor grader equipped as disclosed by the applicant if the front wheel motors 64 and 66 are controlled to develop torque only after the main traction drive wheel sets 24 and 26 develop approximately 2½% slip. Accordingly, the circuitry in the control box 152 has been set up to effect such control of the front wheel motors.

However, under some working conditions with the grader 26 working on a slope for example, it may be desirable for the front wheels to be aggressive to keep the grader tracking properly on the slope and for these conditions the circuitry in the control box includes an "aggressive loop" which may be selectively switched into circuit by a control switch 196 mounted on the control box 152. When the circuit is in its aggressive mode, the wheel motors 64 and 66 are controlled to operate at a speed 1% greater than that of the rear wheel sets 24 and 26.

While the circuitry in the control box 152 is described herein as being operable to produce only one under speed and one over speed mode of operation, it is to be understood that the circuitry could be modified such as to be capable of adjustment to effect an infinite number of operating modes with a desired operating range.

The auxiliary front wheel drive system 62, as applied to the motor grader 10, operates in the following manner.

In order for the auxiliary drive system 62 to be activated for auxiliary drive operation, the battery 158 must be connected to the control circuitry in the control box 152. The operator accomplishes such activation by closing the ignition switch 162, by shifting the gear selector lever 32 to any one of its positions for effecting gears 1-4 in the transmission, such positioning effecting the closing of the switch 164, and by moving the auxiliary drive selector switch 168 to its "on" position. With power connected to the control box 152, the sensors 60 and 82 are energized for sending signals representative respectively of the average speed of the rear wheel sets 24 and 26 and of the speed of the rotor 78 of the left wheel motor 66.

Assuming that the operator has caused the system 62 to be energized in the manner just described but that the direction selector lever 34 is in its neutral position, the motor grader will be standing still and consequently the sensors 60 and 82 will not be sending any signals for processing by the circuitry in the control box 152 and no output signals will be sent to energize the linear electrohydraulic actuator 108 and the swash plate 96 of the pump 84 will thus remain in its centered position wherein it effects the zero-displacement condition in the pump.

If the operator should then desire to drive the grader 10 forwardly, he needs only to place the direction selector lever 34 in its forward position for effecting a forward driving condition in the transmission 46. Such movement of the lever 34 immediately closes the forward drive switch 180 and assuming that the main traction drive clutch is fully engaged, as it should be with the main clutch control pedal 36 released, the main clutch pressure-responsive switch 178 will also be closed thus completing a circuit between the battery 158 and the forward drive lead 174 and forward drive input signal lead 192. Then upon the forward drive clutch becoming fully engaged, the forward drive clutch pressure-responsive switch 184 will close to energize the right and left forward drive solenoid-operated valves 116 and 128 to shift the latter leftwardly, thus resulting in the supply-return line 90 being connected for supplying fluid pressure to the clutch 72 and in the supply-return line 92 being connected for supplying fluid pressure to clutch 74.

With the transmission 46 thus placed in its forward driving condition, forward drive torque will be transmitted therefrom to the rear traction wheel sets 24 and 26 via the differential gearing 50, which also drives the park brake disc 51 at a speed corresponding to the average speed of rotation of the wheel sets 24 and 26. Upon initial rotation of the disc 51, the sensor 60 begins to send electrical pulse command input signals, representative of the speed of such rotation, to the control box 152 for processing. It is noted that at this time, the control box 152 will not be receiving any feed back input signals from the sensor 82 as the left wheel motor 66 will not yet be driving its rotor 78. Assuming that the operator has preselected the condition of the control circuitry in the control box 152 for controlling the left wheel motor 66 to drive at a speed 2½% less than the speed represented by the signal sent by the sensor 60, the control circuitry will process the command and feedback input signals respectively received from sensors 60 and 82 and send an output signal to the electrohydraulic linear actuator 108, via forward drive lead 154. The output signal has a magnitude for energizing the actuator 108 such that it controls the pilot valve for effecting movement of the swash plate 96 of the pump 84 to a position corresponding to that for displacing fluid from the line 94 to the line 86 in a quantity sufficient for causing the rotor 78 of the wheel motor 66 to rotate at a speed 2½% less than the average speed of the rear wheel sets 24 and 26. Once the valve spool of the pilot valve has been shifted and the actuator begins to adjust the angular position of the swash plate 96, the feed back linkage operates to reposition the valve spool to its neutral position. The fluid delivered to the line 88 by the pump 84 is divided by the flow divider-combiner valve to flow to the lines 90 and 92 such as to drive the motors 64 and 66 at equal speeds, the pressurized fluid in the lines 90 and 92 also being connected to the clutches 72 and 74 by virtue of the fact that the solenoid-operated valves 116 and 178 are now energized as described hereinabove.

Of course, once the left wheel motor 66 begins driving, the sensor 82 begins to send an electrical closed loop feedback input signal to the control box 152 for processing together with the command input signal from the sensor 60.

Assuming that the motor grader 10 is traveling straight ahead and that the rear wheel sets 24 and 26 are not slipping the front wheels 16 and 18 will be rotating at the same speed as the rear wheel sets and this speed will exceed that which the motors 64 and 66 are regulated to drive by 2½%. While the pressure required in the lines 90 and 92 for overcoming internal resistances of the motors 64 and 66 and driving their rotors is sufficient for effecting engagement of the clutches 72 and 74 to thereby establish driving connections between the motor 64 and wheel 16 and between the motor 66 and wheel 18, it will be appreciated that, as soon as such connections are established, the wheels drive the motors resulting in the pressure in the lines 90 and 92 being reduced below that necessary for engaging the clutches to permit the wheels to overrun the motors. Thus, the pressure in the lines 90 and 92 modulates above and below that necessary for effecting engagement of the clutches 72 and 74 to thus permit the wheels 16 and 18 to overrun the motors 64 and 66 and in this way avoid main-to-auxiliary drive torque interferences.

Next, assuming that the motor grader 10 continues to be travelling straight ahead as before but now with the rear wheel sets 24 and 26 developing at least 2½% slip, the wheels 16 and 18 will no longer be operating at speeds which are faster than that developed by the motors 64 and 66 and, consequently, the pressure in the lines 90 and 92 will be sufficient to maintain the clutches 72 and 74 in engagement. If the motor grader 10 is then caused to turn sharply to the left, for example, the outside right wheel 16 will be caused to rotate faster than the motor 64 and will consequently drive the motor 64 such as to reduce the pressure in the line 90 below that required for maintaining engagement of the clutch 72. The wheel 16 then overruns the motor 64, to avoid torque interferences, while the motor 66 drives the left wheel 18. The wheel 18 will similarly overrun the motor 16 when the motor grader 10 is turned sharply to the right.

It is to be noted that during turning the divider-combiner valve 86 will operate to restrict the flow path to the outside wheel and that once the turn is completed the restricted passage 93 will act to equalize the pressures in the lines 90 and 92 to ensure that the valve 86 will be repositioned to an unbiased dividing position. Also, during turning with both motors 64 and 66 driving the wheels 16 and 18, the restricted passage 93 will act to bleed drive pressure from that one of the lines 90 and 92, which is connected to the motor driving the inside wheel, to the other line so that a partial differential lock condition is established which results in reduced tire scuffing.

The motor grader 10 may be shifted from its forward driving condition to operate in reverse by moving the direction selector lever 34 from its forward to its reverse position to effect a reverse drive condition in the main traction drive transmission 46. At the same time, the auxiliary drive system 62 is readied for reverse drive operation. Specifically, movement of the lever 34 to its reverse position effects opening the forward drive switch 180 and closing of the reverse drive switch 182. This connects the battery 158 to the reverse drive lead 176 and to the reverse drive input signal lead 194. The movement of the lever 34 also effects the disconnection of hydraulic control pressure from the forward drive clutch 48 and connection of control pressure to the reverse drive brake 49 of the transmission. The forward drive pressure switch 184 opens, upon the reduction of forward drive clutch pressure, to de-energize the right and left forward drive solenoid-operated valves 116 and 128, which results in the release of clutches 72 and 74. Upon the reverse drive brake 49 of the main transmission 46 becoming fully engaged, the reverse drive pressure switch 186 closes to energize the reverse drive solenoid-operated valve 140 which shifts leftwardly to connect the supply-return line 94 in fluid communication with the clutches 72 and 74. At this time, it is possible for the motors 64 and 66 to drive the wheels 16 and 18 to augment the main traction drive in the event that the rear wheel sets 24 and 26 develop at least 2½% slip. Thus, it will be appreciated that the switches 180 and 182, operated by the direction selector lever 34, work in conjunction with the pressure-operated switches 184 and 186 to immediately disconnect the auxiliary drive motors 64 and 66 from the wheels 16 and 18, upon the direction selector lever 34 being moved from one to the other of its operating positions, and then to reconnect the auxiliary drive motors to the front wheels for driving them in the opposite direction only after the main traction drive transmission is driving the rear wheel sets 24 and 26 in the opposite direction. In this way, the engagement and disengagement of the main and auxiliary drive systems are timed so that one drive system does not work against the other. This is especially desirable when the direction selector lever 34 is being shuttled between its forward and reverse positions so as to cause the motor grader 10 to be rocked for dislodging it from a mud hole, for example.

Upon the gear selector lever 32 being shifted to neutral or to any one of its positions 5-8 for establishing corresponding gears in the transmission 46, the switch 164 will be automatically opened to disconnect the battery 158 from the control box 152 to effect deactivation of the auxiliary drive system 62 and consequently deswashing of the pump 84 so that the motors 64 and 66 are no longer driven and the clutches 72 and 74 are no longer engaged. Deactivation of the auxiliary drive 62 when the transmission 46 is in neutral is a safety measure while deactivation of the auxiliary drive when the transmission is shifted to one of its gears 5-8, where need for auxiliary traction is normally not needed, permits free wheeling of the wheels 16 and 18 and discontinues unnecessary fluid flow through the hydraulic circuitry of the auxiliary drive system 62.

During operation of the grader 10, it may become necessary to quickly stop. This is usually done by applying the brakes subsequent to depressing the main clutch pedal 36 to disengage the clutch 47. Disengagement of the clutch 47, automatically deactivates the front wheel drive system 62 by causing the pressure switch 178 to open and disconnect the battery 158 from the direction signal input lines 192 or 194 and from the solenoid-operated valves 116 and 128 or 140 to instantly disengage the wheels from the wheel motors to ensure that the motor grader 10 will be brought to a safe stop.

Another instance when the clutch pedal 36 is depressed such as to effect deactivation of the auxiliary drive system 62 is during inching operation. The pressure at which the switch 178 closes is such that the auxiliary drive system 62 in no way interferes with the inching operation.

I claim:

1. In combination with a vehicle including a reversible main traction drive transmission system connected to drive main traction drive wheels, and, first and second auxiliary traction drive wheels, an auxiliary traction drive system, comprising: a reversible variable displacement pump; first and second hydraulic motors connected in parallel with each other in a closed loop hydraulic circuit connecting the pump to the motors; first and second auxiliary drive connection means respectively connected between the first and second auxiliary traction drive wheels and the first and second motors; said first and second auxiliary drive connection means respectively including first and second pressure-engageable elements responsive to a predetermined minimum pressure for effecting drive connections between the motors and wheels; said closed loop hydraulic circuit comprising a pair of supply-return lines having first ends connected in fluid communication with a first port of the pump and having second ends respectively connected to respective first ports of the first and second motors and a further supply-return line connected between a second port of the pump and respective second ports of the first and second motors; separate first and second conduit means respectively connecting the pair of supply-return lines to the first and second pressure-engageable elements for conveying said predetermined minimum pressure thereto only when fluid pressure in the pair of supply-return lines is driving the motors and a third conduit means connecting the further supply-return line to the first and second pressure-engageable elements for conveying said predetermined minimum pressure thereto only when fluid pressure in the further supply-return line is driving the motors, whereby the auxiliary traction drive wheels automatically become disconnected from the wheel motors to overrun the same any time the wheels have a tendency to drive the motors.

2. In combination with a vehicle including a main traction drive transmission power shiftable between forward and reverse drive conditions respectively in response to first and second control pressures respectively effected in response to moving a direction selector to forward and reverse positions, main traction drive wheels connected to the transmission for being driven thereby and a set of auxiliary traction drive wheels, an auxiliary traction drive system for driving the auxiliary traction drive wheels, comprising: a reversible variable displacement pump including a direction and displacement controller; fluid motor means; supply-return conduit means connecting the pump to the motor means; auxiliary drive connection means connecting the motor means to the auxiliary traction drive wheels and including pressure-engageable element means for establishing a drive connection between the motor means and the auxiliary traction drive wheels only upon becoming pressurized; a source of pressurized fluid; forward and reverse drive conduit means connecting the source of pressurized fluid to the pressure-engageable element means and respectively including forward and reverse valve means each shiftable between a non-actuated condition wherein they block pressurized fluid from the pressure-engageable element means and an actuated condition connecting pressurized fluid to the pressure-engageable element means; forward drive control means connected between the main traction drive transmission and the forward valve means for actuating the latter only upon the direction controller being moved to its forward position and upon the first control pressure being developed in the main traction drive transmission; and reverse drive control means connected between the main traction drive transmission and the reverse valve means for actuating the latter only upon the direction controller being moved to its reverse position and upon the second control pressure being developed in the main traction drive transmission whereby the engagement of the motor means with the auxiliary traction drive wheels is timed to respectively occur after the main traction drive transmission is engaged to drive the main traction drive wheels.

3. The combination as set forth in claim 2 wherein the fluid motor means comprises first and second motors and said set of auxiliary traction drive wheels includes first and second auxiliary drive wheels; said auxiliary drive connection means including first and second pressure-engageable elements responsive to a predetermined minimum pressure to respectively establish a driving connection between the first motor and first auxiliary traction drive wheel and between the second motor and second auxiliary traction drive wheel; said supply-return conduit means includes a pair of supply-return conduits having first ends connected in fluid communication with a first port of the pump and second ends respectively connected to respective first ports of the first and second motors and a further supply-return line connected between a second port of the pump and respective second ports of the first and second motors; said source of fluid pressure being said pump; said forward drive conduit means including separate first and second forward drive conduits respectively connected between the pair of supply-return conduits and the first and second pressure-engageable elements; said reverse drive conduit means including a reverse drive conduit connected between the further supply-return conduit and the first and second pressure-engageable elements; said forward and reverse valve means including a pair of forward drive solenoid-operated valves respectively mounted in first and second forward drive conduits and a reverse drive solenoid-operated valve mounted in the reverse drive conduit; said forward and reverse control means forming part of an electrical control circuit including a source of electrical current; forward and reverse drive leads respectively connected to the pair of forward and to the reverse solenoid-operated valves and to said source of electrical current; a position-responsive forward drive switch and a pressure-responsive forward drive switch connected in series with each other in said forward drive lead and respectively closed only when the direction controller is moved to its forward position and when the first control pressure is developed in the main traction drive transmission; and a position-responsive reverse drive switch connected in series with each other in said reverse drive lead and respectively closed only when the direction selector moved to its reverse position and when the second control pressure is developed in the main traction drive transmission.

4. In combination with a vehicle having a set of main traction wheels coupled to a main traction drive transmission for selectively being driven by the latter and first and second auxiliary traction drive wheels, an auxiliary traction drive system, comprising: first and second reversible hydraulic motors, which each include first and second ports; first and second drive means respectively including first and second pressure-engageable elements and respectively interconnecting the first motor and wheel and the second motor and wheel; said first and second pressure engageable elements being effective for establishing respective drive connections only when pressure fluid is connected thereto; a reversible pump having first and second ports; a forward drive pressure line means connecting the first port of the pump with the first port of each of the motors; a reverse drive pressure line means connecting the second port of the pump with the second port of each of the motors; a forward drive pressure control means including separate first and second line means connected between the forward drive pressure line means and the first and second pressure-engageable elements and including first and second main transmission condition responsive forward drive valve means respectively located in the first and second line means for establishing fluid communication between the forward drive pressure line means and the first and second pressure-engageable elements only in response to the main transmission being in a forward drive condition; a reverse drive pressure control means connected between the reverse drive pressure line means and the first and second pressure-engageable elements and including a main transmission condition responsive forward drive valve means for establishing fluid communication between the reverse drive pressure line means and the first and second pressure-engageable elements only in response to the main transmission being in a reverse drive condition.

5. The combination defined in claim 4 wherein each of the first and second forward and reverse drive valve means are solenoid-operated valves which are respectively actuated only when the main transmission is in forward and reverse drive conditions.

6. The combination defined in claim 4 wherein the forward drive pressure line means includes a divider-combiner valve means located between the first port of the pump and the first ports of the first and second motors and operative for controlling the pressure of the fluid flowing to the first ports of the motors when the pump is delivering fluid from its first port, such that the fluid acts to rotate the motors at equal speeds and operative for controlling the pressure of the fluid flowing from the first ports of the motors when the pump is delivering fluid from its second port, such that the fluid acts to rotate the motors at equal speeds.

7. The combination defined in claim 6 wherein the forward drive pressure line means includes a first line connected between the flow divider-combiner valve means and the first port of the first motor and a second line connected between the flow divider-combiner valve means and the first port of the second motor; said first and second line means of the forward drive pressure control means being respectively connected to the first and second lines of the forward drive pressure means; and a restricted passage interconnecting the first and second lines.

8. In combination with a vehicle including a reversible main traction drive transmission connected to drive main traction drive wheels, and first and second auxiliary traction wheels, an auxiliary traction drive system, comprising: a reversible variable displacement pump including a direction and displacement controller; first and second hydraulic motors connected in parallel with each other in a closed loop hydraulic circuit connecting the pump to the motors; first and second drive connection means respectively connecting the first and second motors to the first and second auxiliary traction wheels; said closed loop hydraulic circuit comprising a flow divider-combiner valve, a first conduit connected between a first port of the pump and the divider-combiner valve, second and third conduits connected between the divider-combiner valve and respective first ports of the motors; and a fourth conduit connecting respective second ports of the motors to a second port of the pump; and a restricted passage connected between the second and third conduits, whereby, after the vehicle completes negotiating a turn, the restricted passage permits flow therethrough to equalize the pressure in the second and third lines to re-center the flow divider-combiner valve.

9. The combination defined in claim 8 wherein said first and second drive connection means respectively include first and second pressure-engageable elements for establishing respective drive connections between the first motor and auxiliary drive wheel and between the second motor and auxiliary drive wheel only upon being pressurized; a first and second forward drive line means respectively connecting the second conduit to the first pressure-engageable element and connecting the third conduit to the second pressure-engageable element; a reverse drive line means connecting the fourth conduit to the first and second pressure-engageable elements; and shuttle valve means connected to the first and second pressure-engageable elements, to the first and second forward drive line means and to the reverse drive means for preventing flow between the first and second forward drive line means and between each of the latter and the reverse drive line means when the pump is pumping fluid to the second and third conduits, and for preventing flow between the reverse drive line means and each of the first and second forward drive line means when the pump is pumping fluid to the fourth conduit.

* * * * *